US011759961B2

(12) United States Patent
Rose

(10) Patent No.: US 11,759,961 B2
(45) Date of Patent: Sep. 19, 2023

(54) PNEUMATIC ROBOTIC FINISHING TOOL

(71) Applicant: ATI Industrial Automation, Inc., Apex, NC (US)

(72) Inventor: Benjamin Richard Rose, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 476 days.

(21) Appl. No.: 16/795,673

(22) Filed: Feb. 20, 2020

(65) Prior Publication Data
US 2020/0353615 A1 Nov. 12, 2020

Related U.S. Application Data

(60) Provisional application No. 62/844,459, filed on May 7, 2019.

(51) Int. Cl.
*B25J 15/00* (2006.01)
*F15B 7/02* (2006.01)
*F15B 13/02* (2006.01)

(52) U.S. Cl.
CPC ............ *B25J 15/0019* (2013.01); *F15B 7/02* (2013.01); *F15B 13/02* (2013.01)

(58) Field of Classification Search
CPC ..... B24B 23/026; B24B 23/043; B24B 47/14; F16B 7/02; F16B 13/02
(Continued)

(56) References Cited

U.S. PATENT DOCUMENTS 5,053,687 A * 10/1991 Merlet ................. B25J 17/0216
318/566
5,765,276 A 6/1998 Pichot
(Continued)

FOREIGN PATENT DOCUMENTS

CN 1162778 A 10/1997
CN 103189193 A 7/2013
(Continued)

OTHER PUBLICATIONS

Machine Translation of CN109590853 (Year: 2019).*
Machine Translation of CN 105798747 (Year: 2016).*
Machine Translation of KR-20160027771 (Year: 2016).*

*Primary Examiner* — Orlando E Aviles
*Assistant Examiner* — Robert F Neibaur
(74) *Attorney, Agent, or Firm* — COATS & BENNETT, PLLC

(57) ABSTRACT

A pneumatic robotic tool, such as grinder, sander, etc., implements passive force control and compliance using two or more double-acting pneumatic pistons distributed about a pneumatic motor within the tool housing. The multiple pistons facilitate a compact design, reducing tool stack height, as compared to prior-art, single-piston designs. In one embodiment, filtered breather vents and an air pressure equalization passage maintain ambient atmospheric pressure throughout the tool, while preventing the infiltration of dust and other particulates. In one embodiment, a hard port rigidly affixed to the tool housing is provided for at least motor supply pneumatic fluid. The motor supply air is transferred from the hard port to the pneumatic motor via a flexible pneumatic fluid tube within the tool housing. In one embodiment, the pneumatic motor discharge air is vented from the tool housing in a sealed passage that accommodates the tool compliance motion, and prevents dust infiltration.

18 Claims, 8 Drawing Sheets

(58) Field of Classification Search
USPC ......... 451/11, 159, 163, 270, 294, 295, 359, 451/360, 363
See application file for complete search history.

(56) References Cited

U.S. PATENT DOCUMENTS

| | | | |
|---|---|---|---|
| 7,137,763 B2* | 11/2006 | Lawson | ................... B23B 31/08 408/127 |
| 10,029,347 B2* | 7/2018 | Xie | ........................ B23K 20/12 |
| 11,192,259 B2* | 12/2021 | Liaw | ....................... B24B 27/04 |
| 2005/0180829 A1 | 8/2005 | Lawson | |
| 2014/0005831 A1* | 1/2014 | Naderer | .................. B25J 9/1687 700/258 |
| 2014/0270926 A1 | 9/2014 | Norton | |
| 2016/0061226 A1 | 3/2016 | Xie et al. | |
| 2019/0111570 A1 | 4/2019 | Naderer | |

FOREIGN PATENT DOCUMENTS

| | | | | |
|---|---|---|---|---|
| CN | 204622064 U | | 9/2015 | |
| CN | 105751218 A | | 7/2016 | |
| CN | 105798747 A | * | 7/2016 | |
| CN | 208203360 U | | 12/2018 | |
| CN | 109590853 A | * | 4/2019 | ............ B24B 19/00 |
| DE | 69502926 T2 | | 2/1999 | |
| DE | 102014204531 A1 | | 9/2014 | |
| DE | 102015104164 A1 | | 9/2016 | |
| DE | 102019105022 B3 | | 3/2020 | |
| KR | 20160027771 A | * | 3/2016 | |

* cited by examiner

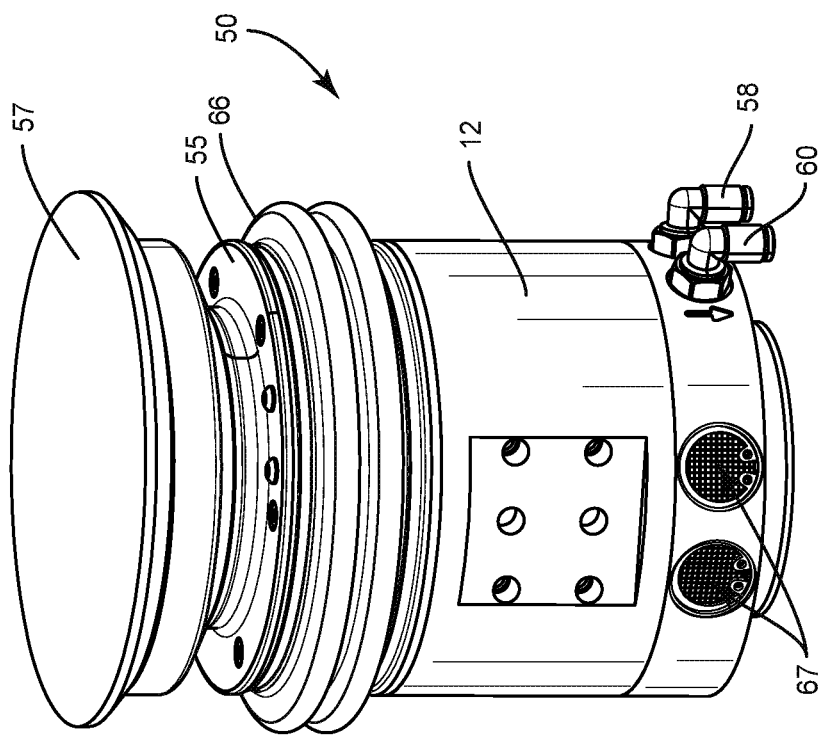
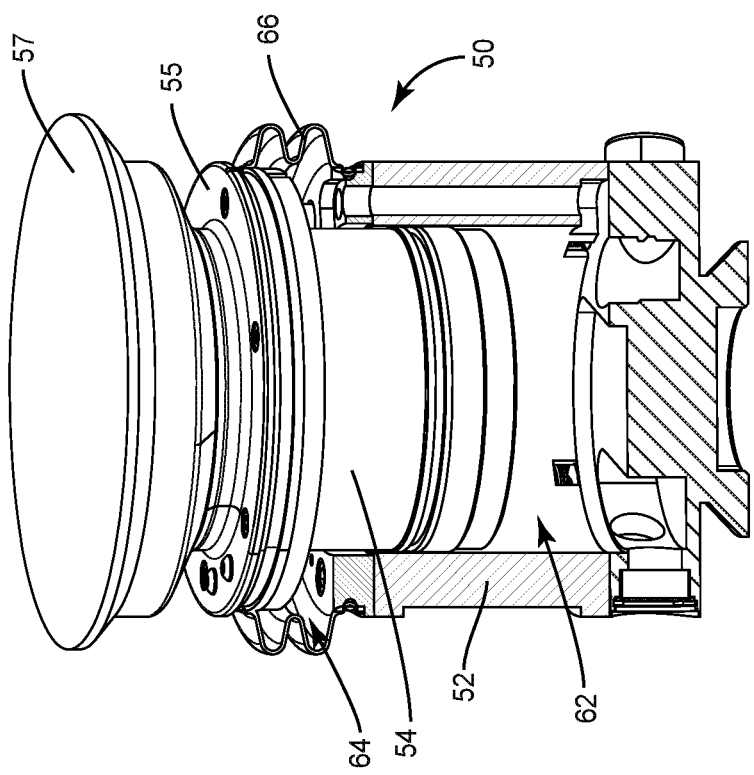
FIG. 4B
FIG. 4A

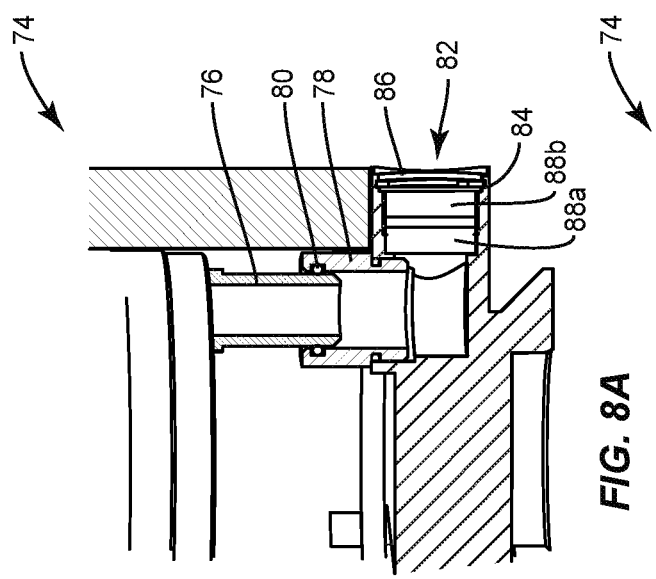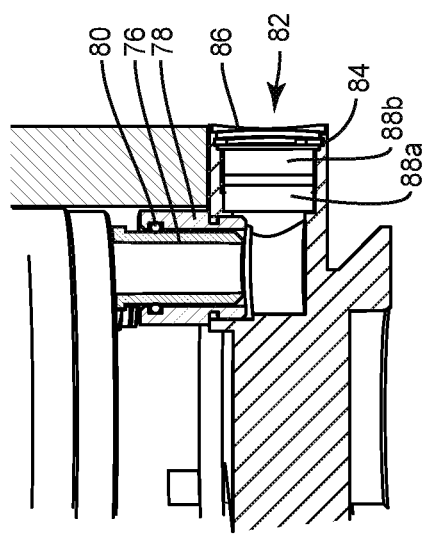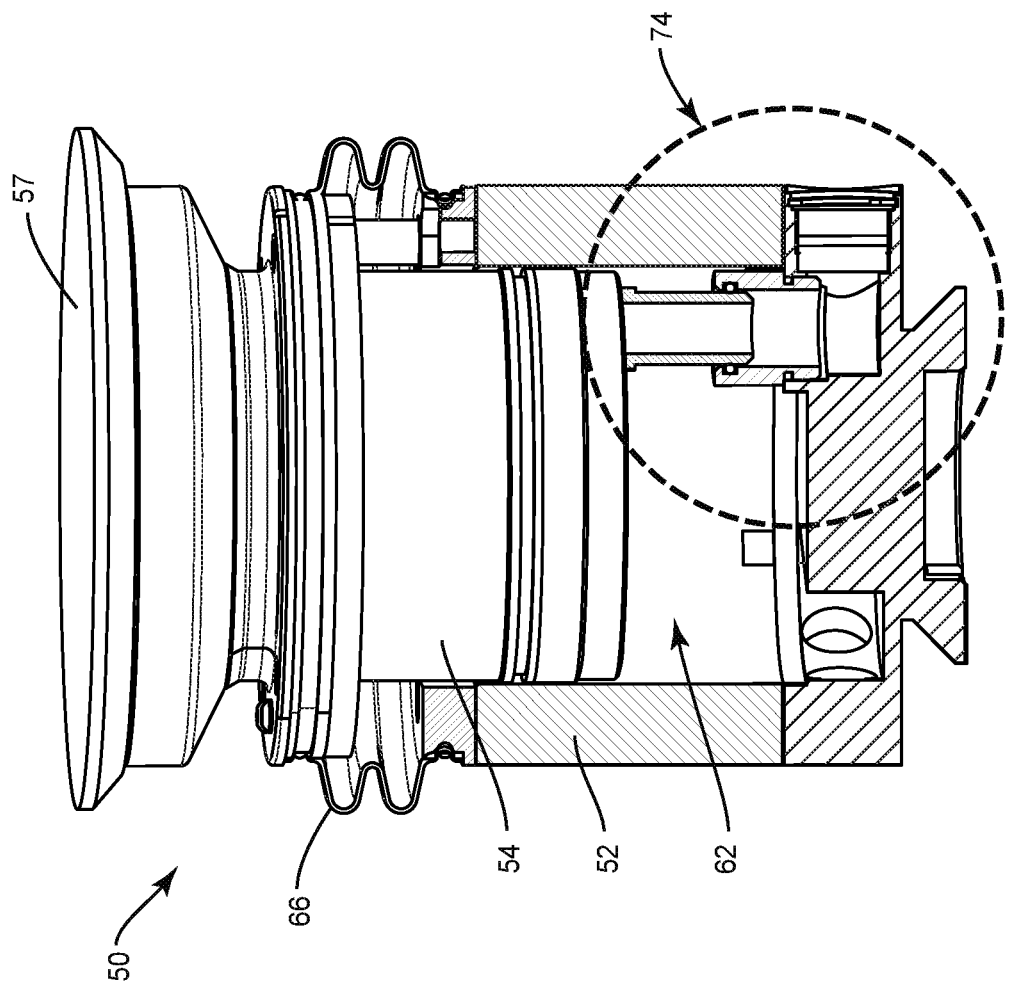

PNEUMATIC ROBOTIC FINISHING TOOL

This application claims priority to U.S. Provisional Patent Application No. 62/844,459, filed May 7, 2019, titled "Pneumatic Robotic Finishing Tool," the disclosure of which is incorporated herein by reference in its entirety.

FIELD OF INVENTION

The present invention relates generally to robotics, and in particular to a pneumatically-driven robotic finishing tool having numerous mechanical features.

BACKGROUND

Industrial robots have become an indispensable part of modern manufacturing. Robots perform many manufacturing tasks tirelessly, in hostile environments, and with high precision and repeatability.

Many components of robotic systems, such as robotic tools, and robotic tool changers that interface robotic tools to robot arms, are pneumatically driven. Abundant amounts of compressed air, at required pressures, humidity, and the like, can be supplied reliably and inexpensively by basic equipment. Compressed air is not flammable or toxic, it carries no shock hazard, and it generates no waste products. However, conventional pneumatic robotic tools have numerous deficiencies.

One of the programmable parameters with which a robot shapes or processes a workpiece is the degree of force applied. For example, in grinding, sanding, polishing, deburring, and similar material removal operations, the force with which the robot presses a tool, such as a grinder or polishing wheel, into the workpiece is an important parameter for proper operation. Additionally, the robotic tool requires some compliance, or freedom of motion through a limited range, to accommodate workpiece surface topologies. Although complex, active force control systems are known in the art, for many finishing operations such precise control is not necessary—adequate performance can be achieved by passive force control. As used herein, a passive force control system attempts to maintain a preset pressure, or force, with which a tool is applied to a workpiece, throughout a robotic finishing operation. In many cases, one of the primary goals of a passive force control system is simply to counter, or support, the weight of the tool.

Supporting the weight of a tool via a pneumatic piston is known in the art. This configuration allows the force applied to a workpiece to be set by adjusting the pressure in the piston. Additionally, the air behind the piston is compressible, and provides some amount of natural compliance. However, conventional pneumatic pistons are large, and increase the "stack height," or length of the robotic tool between the robot arm and the workpiece.

Additionally, robotic tools utilizing a pneumatic piston for passive force control and compliance necessarily have a "telescoping" action, wherein the length of the tool changes as it undergoes compliance. Due to the very large amount of dust and other particulates in the air around a sander or grinder, the tool is often sealed, such as by the use of o-rings or pliant sealing features. However, this creates an effective second piston, which counteracts the desired compliance motion due to a pressure or vacuum developing within the tool housing, relative to the air around it. On the other hand, an unsealed tool body, which largely eliminates this counteracting force, allows dust and contaminants to enter the tool housing, which presents cleaning and maintenance issues, and which may interfere with the tool operation, or accelerate wear.

Another known problem with pneumatically driven motors is supplying compressed air to them while isolating any impact, torque, pull, or the like due to the pneumatic fluid supply and exhaust lines. FIGS. 1A and 1B depicts two examples of pneumatic robotic tools known in the art. FIG. 1A depicts a deburring tool 10. As shown in the cutaway perspective view, the deburring tool 10 comprises a housing 12, which houses a pneumatic motor 14. The pneumatic motor 14 drives a shaft 16, which turns a grinding wheel or other tool which may be fitted into a chuck 18 at the end of the shaft 16. Pneumatic fluid is supplied to the motor 14 via a coupling 20, which is rigidly attached to the motor 14.

FIG. 1B depicts a drill 30. Similarly to the deburring tool 10 of FIG. 1A, the drill 30 comprises a housing 32, which houses a pneumatic motor 34. The pneumatic motor 34 drives a shaft 36, which turns a drill bit or other tool which may be fitted into a chuck 38 at the end of the shaft 36. The drill 30 exhibits axial compliance, in that the motor 34, shaft 36, and chuck 38 may move in an axial direction (closer to or further from a workpiece), while the housing 32 remains in a fixed position at the end of a robotic arm. Dual guide pins 31 facilitate this compliance while keeping the motor 34 centered within the housing 32. A flexible boot 33 connects an end plate 35, which moves with the motor 34, to the housing 32, to prevent the ingress of dust, filings, and the like into the interior of the housing 32. Pneumatic fluid is supplied to the motor 34 via a coupling 40, which is rigidly attached to the motor 34. The air is discharged through a muffler 42. Note that dual guide pins 31 are parallel with the motor 34, providing for some axial motion of the drill 30; these guide pins 31 are not pneumatic pistons.

In both of these cases, the pneumatic fluid supply couplings 20, 40 are rigidly attached to the respective pneumatic motors 14, 34. If the coupling 20, 40, or pneumatic fluid line hooked to it, experiences any impact or tugging during use, it may transmit that force through the motor 14, 34 to the tool portion contacting a workpiece (e.g., a grinder or drill bit). This may disturb the robot's programmed operation, inducing gouges or other imperfections in the workpiece surface.

Exhausting air from a pneumatic motor 14, 34 can also be problematic. The exhaust should not induce any force or torque on the motor 14, 34, which may be transmitted through the tool 10, 30 to the workpiece. Additionally, if the exhaust air is ported away, the same issues apply with respect to isolating the pneumatic lines from contact or tugging.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a pneumatic robotic tool, such as grinder, sander, or the like, implements passive force control and compliance using two or more double-acting pneumatic pistons distributed about the periphery of the tool housing. The multiple pistons facilitate a compact design, reducing tool stack height, as compared to prior-art, single-piston designs. In one embodiment, filtered breather vents and an air pressure equalization passage maintain ambient atmospheric pressure throughout the tool, while preventing the infiltration of dust and other particulates. In one embodiment, a hard port rigidly affixed to the tool housing is provided for at least motor supply pneumatic fluid. The motor supply air is transferred from the hard port to the pneumatic motor via a flexible pneumatic fluid tube within the tool housing. In this manner, contact, tugging, torque, and the like inadvertently applied to the pneumatic fluid supply line does not transfer to the motor or the operative tool surface, such as the grinder head. In one embodiment, the pneumatic motor discharge air is vented from the tool housing in a sealed passage that accommodates the tool compliance motion, and prevents dust infiltration.

One embodiment relates to a pneumatic robotic tool adapted to be attached to a robot arm. The tool includes a housing and a pneumatic motor disposed within the housing. A first cavity is defined within the housing between the pneumatic motor and an end of the housing affixed to the robot arm. The tool further includes a plurality of double-acting pneumatic pistons. Each piston has a pneumatic chamber fore and aft of a piston member. The pistons are disposed around the motor and moveably suspend the motor within the housing, such that the motor exhibits compliance motion, throughout a predetermined range, toward or away from the robotic arm.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 4A is a partial cut-away perspective view of a pneumatic robotic tool showing upper and lower cavities.

FIG. 4B is a perspective view of the pneumatic robotic tool showing breather vents.

FIG. 7 is a partial cut-away perspective view of the pneumatic robotic tool showing the motor air exhaust port.

FIG. 8A is an enlarged section view of the motor air exhaust port with the pneumatic robotic tool in an extended position.

FIG. 8B is an enlarged section view of the motor air exhaust port with the pneumatic robotic tool in a retracted position.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

According to one embodiment of the present invention, two or more double-acting pneumatic pistons provide passive force control and compliance for a pneumatic robotic tool, such as a grinder/sander/polisher. As known in the art, a double-acting pneumatic piston is one that has air ports both ahead of and behind a piston. Hence, the force and compliance the tool experiences in either direction, along an axis parallel to the pistons' axes, can be separately controlled.

Figure 2:
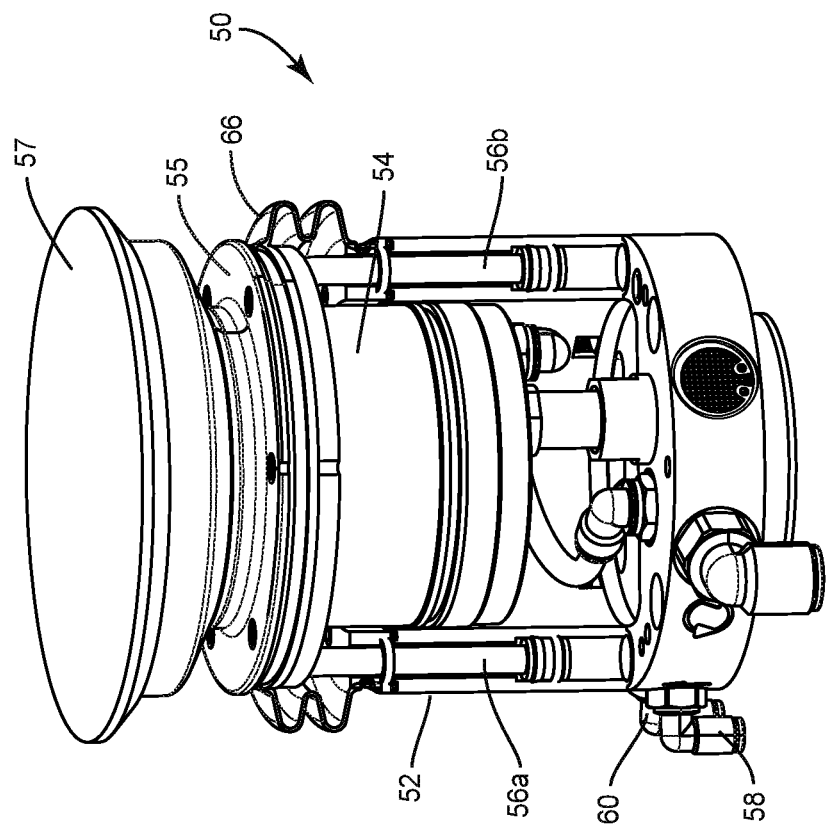
FIG. 2 is a partial cut-away perspective view of a pneumatic robotic tool having multiple pistons.

FIG. 2 depicts a representative example of a pneumatic robotic tool 50 having a housing 52, which houses a pneumatic motor 54 (the housing is cut away in the views of FIG. 2 for clarity). The pneumatic motor 54 drives a rotating surface 57, to which may be affixed a grinding wheel, polishing wheel, or the like. The pneumatic motor 54 is suspended within the housing 52 by two double-acting pneumatic pistons 56a, 56b. The motor may, or may not, be sealed against the inner surface of the housing, such as by an o-ring or similar seal. As known in the art, a double-acting pneumatic piston comprises a piston member disposed in a cylinder, defining chambers on both sides of the piston member. The pneumatic pistons 56 allow the motor 54, the end plate 55, and the rotating surface 57 to move within the housing 52, throughout a predetermined range, along an axis toward or away from the robot arm to which the housing 52 is affixed (vertically, as depicted in the Figures). This motion is referred to herein as compliance motion in an axial direction (as it is along the axis of rotation of the motor 54). Compliance motion allows the pneumatic robotic tool 50 to accommodate variations in topology of a workpiece, as a robot arm supporting the tool 50 moves, e.g., in a straight line. Throughout this range of compliance motion, the pneumatic pistons 56 control the force applied to a workpiece by the rotating surface 57, referred to herein as compliance force.

A flexible boot 66 between the end plate 55 and housing 52 seals the interior of the housing 52 from the ingress of dust, filings, and the like. This dual-piston 52 configuration—wherein the double-acting pneumatic pistons 56a, 56b are positioned beside (or around) the motor 52—reduces the "stack height" of the tool 50, or the extent of the tool 50 extension from the end of a robot arm, as opposed to the use of a single piston, which generally must be centered axially behind the motor 54.

One purpose of the multiple, double-acting pneumatic pistons 56 is to bias out the weight of the tool 50. For example, in an application where a robot arm hovers over a workpiece and grinds or polishes an upper surface of the workpiece, the weight of the tool 50 must be countered by pressurizing the piston 56 chambers on the workpiece side (referred to herein as the fore chambers)—this "zeros out" the tool weight. The desired force to be applied to the workpiece is then set by altering this "zero" force by the desired delta.

Figure 3:
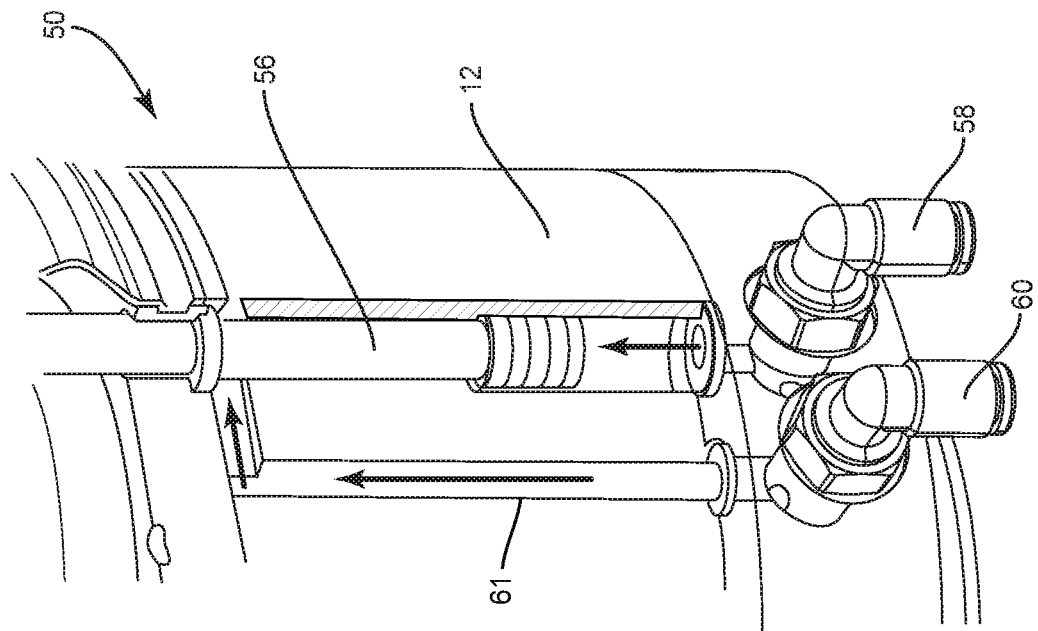
FIG. 3 is an enlarged partial cut-away perspective view showing air routing to and from one double-acting pneumatic piston.

FIG. 3 is an enlarged, cutaway section view of one double-acting pneumatic piston 56. Connected to the base of the piston 56, in pneumatic fluid flow relationship, is an "extend air" pneumatic fluid line coupling 58. Pneumatic fluid entering the extend air coupling 58, from an attached pneumatic fluid line (not shown), is injected into the "aft" chamber of the double-acting pneumatic piston 56, biasing the tool 50 to an extended position—that is, away from the end of the robot arm. In a configuration where the robot arm is positioned directly below a workpiece, the aft chamber may be pressurized to substantially support the weight of the tool 50, plus a slight additional pressure to provide a desired contact force with the workpiece.

A "retract air" pneumatic fluid line coupling 60 connects to a "fore" chamber of the double-acting pneumatic piston 56. The retract air coupling 60 communicates with the fore chamber of the piston 56 in pneumatic fluid flow relationship via a passageway 61 within the housing 52. Pneumatic fluid entering the retract air coupling 60, from an attached pneumatic fluid line (not shown), is injected into the fore chamber of the double-acting pneumatic piston 56, biasing the tool 50 to a retracted position—that is, towards the end of the robot arm and away from the workpiece. In a configuration where the robot arm is positioned directly above a workpiece, the fore chamber may be pressurized to substantially support the weight of the tool 50, minus a slight amount of pressure to provide a desired contact force with the workpiece.

As depicted in FIG. 3, both an extend air coupling 58 and retract air coupling 60 are provided. These route pneumatic fluid from respective attached pneumatic fluid lines (not shown) to the aft or fore chamber, respectively, of each piston 56. In one embodiment, each individual piston 56a, 56b has separate associated extend and retract air couplings 58, 60. In another embodiment, one set of extend and retract couplings 58, 60 provides the pneumatic fluid to the appropriate chambers of two or more pistons 56a, 56b, e.g., via channels formed in the tool housing 52 or via pneumatic fluid lines or passages (not shown).

As discussed above, some prior art robotic tools 30 (See FIG. 1B) that exhibit axial compliance have a "telescoping" construction that allows portions of the tool 30—such as the motor 34, end plate 35, shaft 36, and chuck 38—to move closer to or further from a workpiece, while the housing 32 remains in a fixed position at the end of a robotic arm. A boot 33 or similar device seals the interior of the housing 32 against the ingress of dust, filings, and the like. As the motor 34 and other parts move within the housing 32, however, the pressure within the interior, which is sealed by the boot 33, changes. This changing pressure affects the tool's compliance force.

FIG. 4A depicts a partial cutaway perspective view of the pneumatic robotic tool 50. A flexible boot 66 connects an upper end plate 55 with the top of the housing 52, to prevent the ingress of dust, filings, and the like. The housing 52 (above the motor 54), the end cap 55, and the boot 66 define an upper cavity 64. As described above, the motor 54 and rotating surface 57 are moveable in an axial direction, relative to the tool housing 52, by altering pneumatic pressure in the fore and aft chambers of the double-acting pneumatic pistons 56 (see FIGS. 2, 3). As the motor 54 moves to an extended position within the housing 52, a lower cavity 62 is formed in the interior of the housing 52. Similarly, as the motor 54 moves to a retracted position within the housing 52, an upper chamber 64 is formed between the housing 52 and the end plate 55, within the boot 66.

To prevent pressure changes in, e.g., the lower cavity 62 of the housing 52, due to axial movement of the motor 54, from affecting the tool's compliance force, one or more filtered ports, or "breather vents" 67 connect the lower cavity 62 to the exterior of housing 52. Air is free to move in either direction through the breather vents 67, and hence the lower cavity 62 of the housing 52 is maintained at atmospheric pressure throughout the range of compliance motion of the pneumatic motor 54. As depicted in section view in FIG. 5A, each breather vent 67 includes a screen 68, which prevents the passage of dust, filings, or the like, but allows the free flow of air into and out of the vent 67. In one embodiment, a filter media 71 provides additional filtering (e.g., for particulates finer than the screen 68 can stop). The filter 71 and screen 68 may be secured, in one embodiment, by a snap ring 69. Of course, other configurations of the breather vent 67 are possible within the scope of the present invention. Any number of breather vents 67 may be installed, in any location on the housing 52, so as to maintain a constant, atmospheric pressure within the interior of the housing 52, regardless of the compliance motion of the motor 54 and other parts.

Figure 5B:
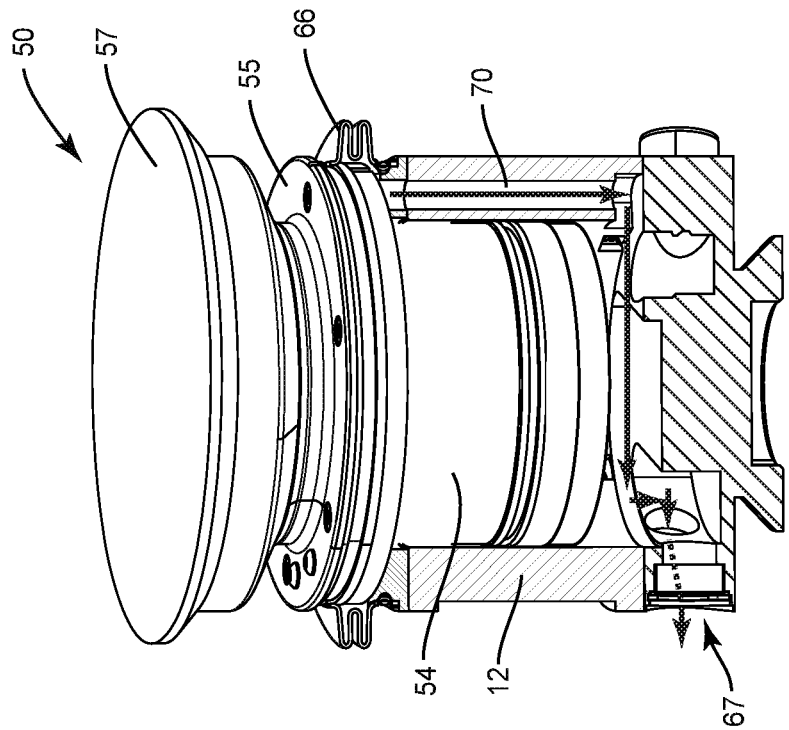
FIGS. 5A and 5B are partial perspective/section views of the pneumatic robotic tool showing operation of the breather vents.
Figure 5A:
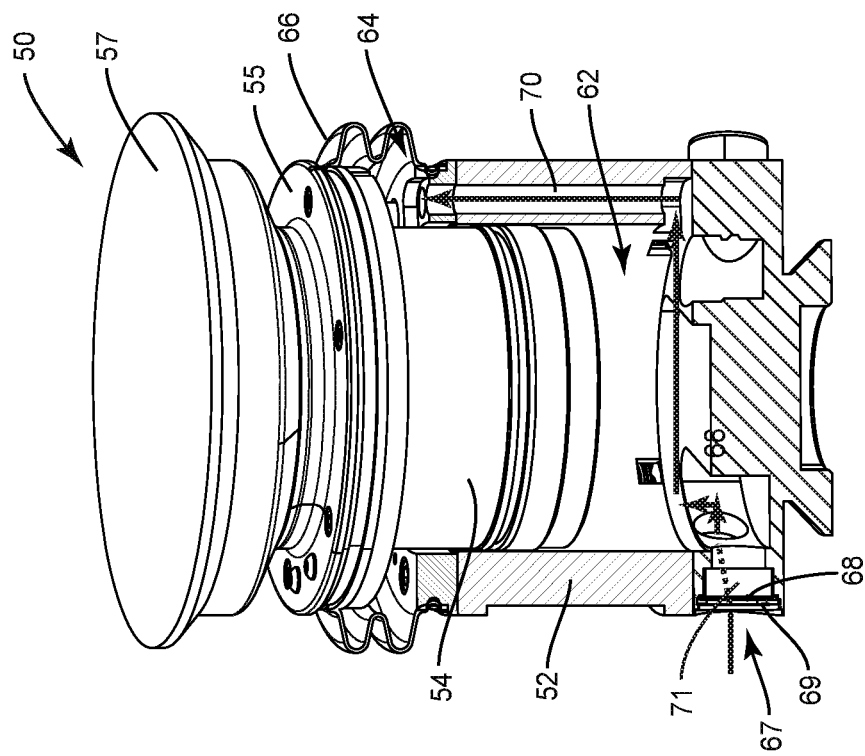

Furthermore, as depicted in FIGS. 5A and 5B, at least one air pressure equalization passage 70, formed for example in the wall of the housing 52, connects the lower cavity 62 with the upper cavity 64. This ensures atmospheric pressure is maintained also in the upper cavity 64, regardless of the compliance motion of the motor 54, et al. As depicted by bold-line arrows in FIG. 5A, when the motor 54 and other parts assume an extended position (i.e., when pneumatic pressure is increased in the aft chambers of the double-acting pneumatic pistons 56), air flows in through one or more breather vents 67, through the lower cavity 62, up through one or more air pressure equalization passages 70, and into the upper cavity 64. Conversely, as depicted by bold-line arrows in FIG. 5B, when the motor 54 and other parts assume a retracted position (i.e., when pneumatic pressure is increased in the fore chambers of the double-acting pneumatic pistons 56), air flows from the collapsing upper cavity 64, through one or more air pressure equalization passages 70, through the lower cavity 62, and exits one or more breather vents 67 to the exterior of the housing 52. In this manner, the same (atmospheric) pressure is maintained in both the lower and upper cavities 62, 64 throughout all axial compliance motion of the motor 54 and other parts. Accordingly, the compliance force of the tool 50 is not affected by compliance motion of the motor 54.

Figure 1A:
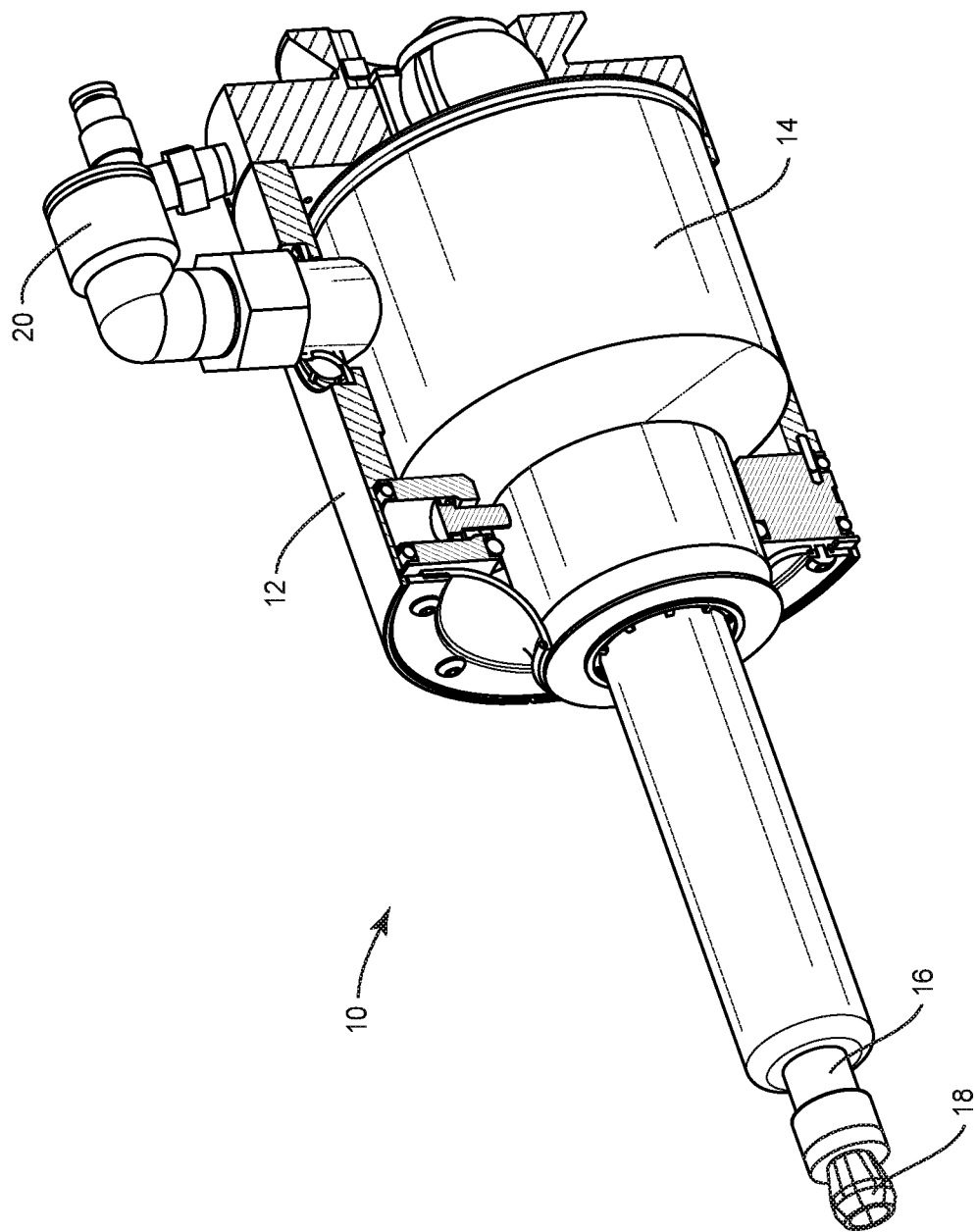
FIG. 1A is partial cut-away perspective view of a prior art pneumatic robotic deburring tool.
Figure 1B:
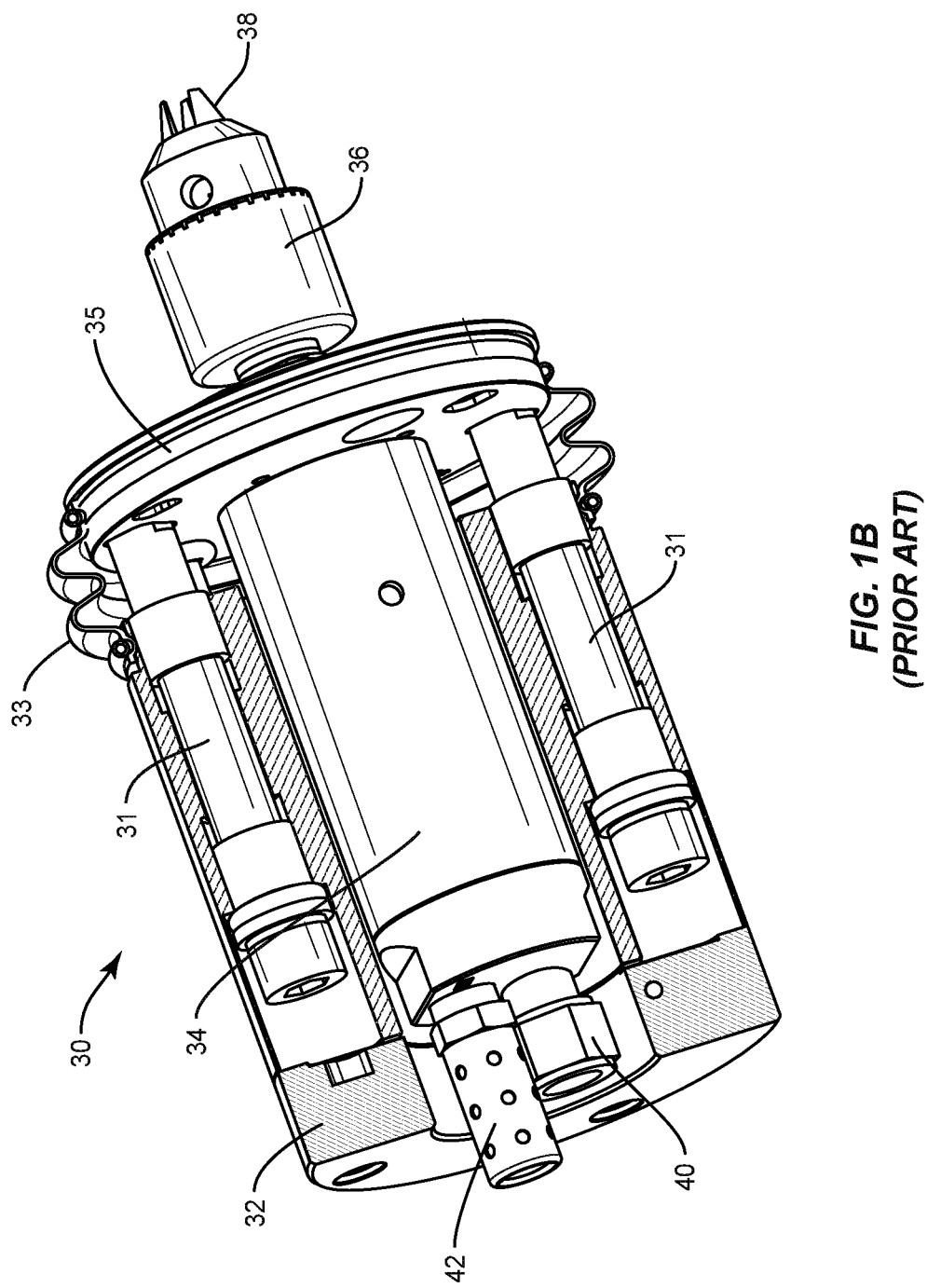
FIG. 1B is partial cut-away perspective view of a prior art pneumatic robotic drilling tool.
Figure 6:
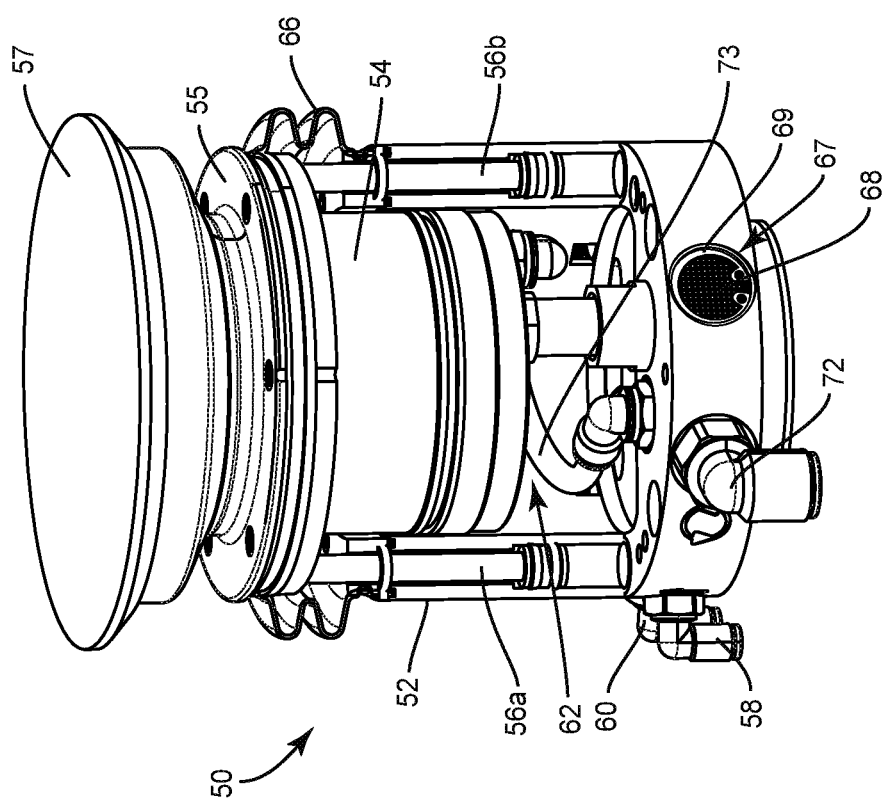
FIG. 6 is a partial cut-away perspective view of the pneumatic robotic tool showing the motor air supply tube within the lower chamber of the tool housing.

As depicted in FIGS. 1A and 1B, in many prior art pneumatic robotic tools 10, 30, the pneumatic fluid supply (and optionally exhaust) lines are connected directly to the pneumatic motor 14, 34, such as via couplings 20, 40. Due to this arrangement, any contact with, or tugging or torque inadvertently applied to, the pneumatic fluid lines or couplers 20, 40 could perturb the action of the tool on the workpiece surface, causing defects. FIG. 6 depicts a pneumatic robotic tool 50 having a rigid motor drive pneumatic fluid line coupling 72 affixed to the housing 52. Within the interior of the housing 52, the motor drive pneumatic fluid is supplied from the coupling 72 to the motor 54 by a flexible pneumatic supply tube 73. In this tool 50, any contact, tugging, torque, or the like applied to an external motor drive pneumatic fluid supply line (not shown) terminates at the rigid coupling 72, which is affixed to the housing 52, which in turn is affixed to the robot arm. The flexible pneumatic supply tube 74 internal to the tool housing 52 carries the motor drive pneumatic fluid from the rigid motor drive coupling 72 to the pneumatic motor 54, without transferring to the motor 54 any mechanical force that may be imparted to (and absorbed by) the rigid motor drive coupling 72. In this manner, the pneumatic motor 54 and the rotating surface 57 are mechanically and vibrationally isolated from the pneumatic fluid supply line. For large pneumatic motors 54 having more than one motor drive pneumatic fluid supply port, multiple rigid motor drive couplings 72 and corresponding flexible pneumatic supply tubes 74 may be provided. In embodiments (not shown) where motor 54 exhaust air is discharged to a pneumatic fluid line, one or more flexible pneumatic supply tube 74 may connect exhaust ports on the motor 54 to one or more hard-mounted rigid couplings 72, to which the external pneumatic fluid discharge line(s) are connected.

In embodiments without dedicated exhaust air lines, simply venting exhaust air from the motor 54 may allow the infiltration of dust or other contaminants into the interior of the housing 52. Even in embodiments with one or more filtered breather vents 67, which prevent the ingress of dust, simply porting exhaust air to the atmosphere may interfere with the tool 50 compliance motion. For example, even with filtered breather vents 67, venting a large volume of air from the motor 54 may create a positive pressure within the tool housing 52, relative to ambient air, which may interfere with the tool's compliance motion, or the biasing (e.g., of tool 50 weight) by the double-acting pneumatic pistons 56. Furthermore, this pressure would vary between the motor 54 being on and off, and also at different operating speeds of the motor 54.

FIG. 7 depicts an exhaust system 74 according to one embodiment of the present invention. The exhaust system 74 is depicted in greater detail in enlarged section views of FIG. 8A, showing the motor 54 in an extended position, and FIG. 8B, showing the motor 54 in a retracted position. Exhaust air leaves the pneumatic motor 54 via a first rigid exhaust tube 76, which has an outer diameter (OD). The first rigid exhaust tube 76 is affixed to the pneumatic motor 54, and moves in the axial direction as the motor 54 experiences compliance motion within the tool housing 52. A second rigid exhaust tube 78, which has an inner diameter (ID) slightly greater than the OD of the first rigid exhaust tube 76, receives the first rigid exhaust tube 76 at a first end, and is fixedly attached to the tool housing 52 at a second end. The second rigid exhaust tube 78 directs air received from the first rigid exhaust tube 76 to a discharge port 82 formed in the housing 52. The discharge port 82 includes a screen 84, which prevents ingress of dust, filings, or other particulates, but allows the free flow of air out of the discharge port 82. In one embodiment, two stages of filter media 88a, 88b provide acoustic muffling to reduce the sound of exhausting air, as well as more efficient filtering than the screen 84. The filters 88 and screen 84 may be secured, in one embodiment, by a snap ring 86. Of course, other configurations of the discharge port 82 are possible within the scope of the present invention.

As depicted, the first rigid exhaust tube 76 fits within the first end of the second rigid exhaust tube 78, and slides in and out in a telescoping manner, similar to a trombone slide, as the motor 54 moves between extended and retracted positions, or any intermediate position. One or more o-rings 80 or similar deformable member form a seal between the first rigid exhaust tube 76 outer surface and the second rigid exhaust tube 78 inner surface, proximate to the first end of the second rigid exhaust tube 78. The tubes 76, 78 are sized and positioned, and the o-ring 80 is positioned, such that at least a portion of the first rigid exhaust tube 76 is sealed within the second rigid exhaust tube 78 throughout the tool's range of compliance motion. For example, the o-ring 80 may be seated in an annular groove formed in the inner surface of the second rigid exhaust tube. Because the second rigid exhaust tube 78 (and discharge port 82) are rigidly affixed to the tool housing 52 (which is affixed to a robot arm), the volume of exhaust air being discharged at any given time has no mechanical effect on the tool 50. Because the exhaust air is ported to the exterior of the housing 52, the presence or volume of exhaust air does not change the air pressure of the interior of the housing 52, and hence has no effect on the tool's compliance motion or force.

Figure 9:
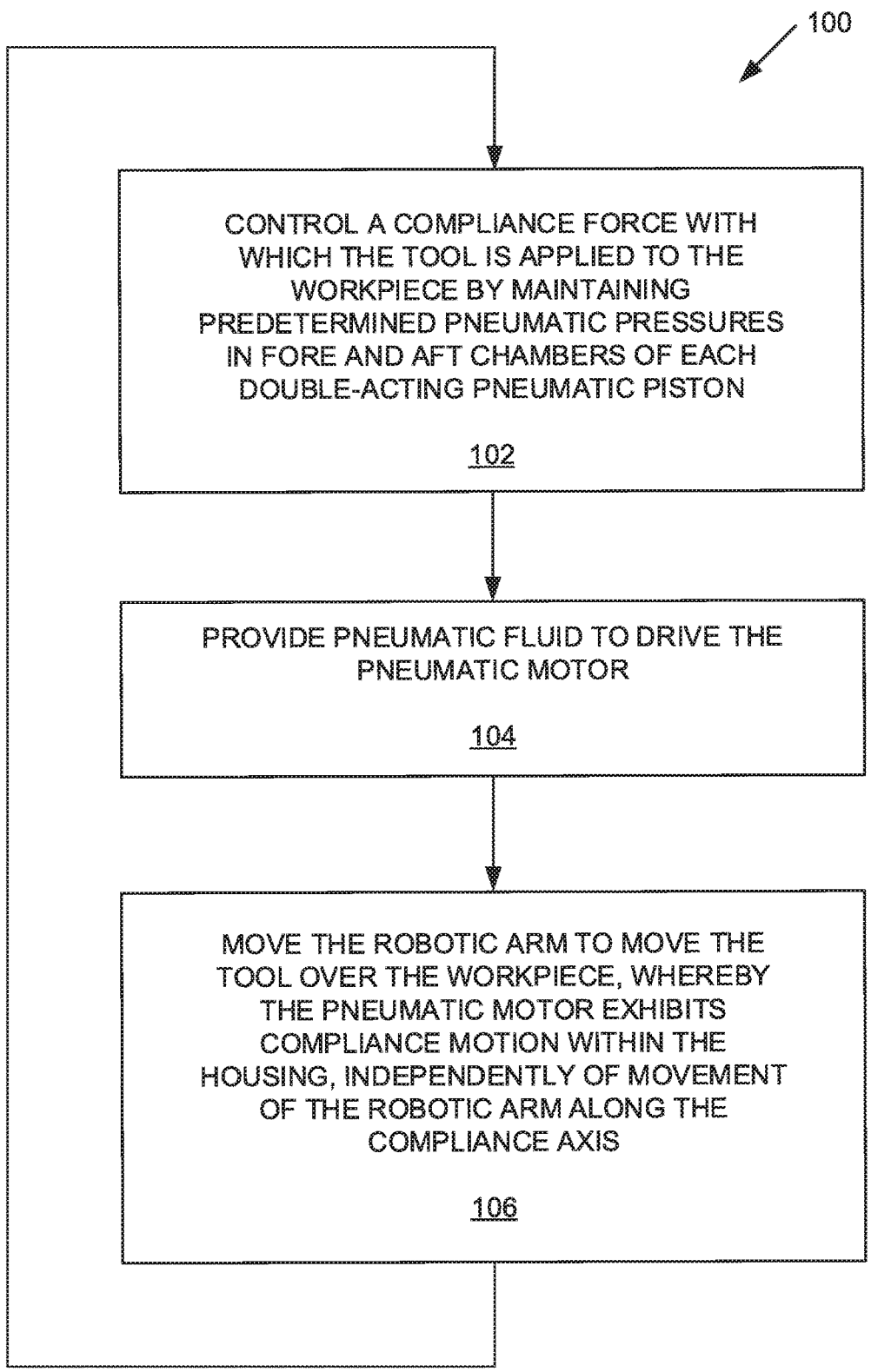
FIG. 9 is a flow diagram of a method of robotically finishing a workpiece using a pneumatic robotic finishing tool attached to a robot arm.

FIG. 9 depicts a method of finishing a workpiece using a pneumatic robotic finishing tool 50 attached to a robot arm. The tool 50 includes a housing 52, a pneumatic motor 54, and a plurality of double-acting pneumatic pistons 56 suspending the motor 54 within the housing 52 and allowing the motor 54 to move within the housing 52 along a compliance axis. A compliance force with which the tool 50 is applied to the workpiece is controlled by maintaining predetermined pneumatic pressures in fore and aft chambers of each double-acting pneumatic piston 56. Pneumatic fluid to drive the pneumatic motor 54 is provided. The robotic arm is moved to move the tool 50 over the workpiece, whereby the pneumatic motor 54 exhibits compliance motion within the housing 52, independently of movement of the robotic arm, along the compliance axis.

Embodiments of the present invention present numerous advantages over pneumatic robotic tools known in the prior art. By utilizing multiple double-acting pneumatic pistons 56 distributed about the periphery of the tool housing 52, an overall compact design is realized that reduces tool 50 stack height relative to prior art single-piston designs 10, 30. The full sensitivity of the passive force control and tool compliance is preserved by the use of filtered breather vents 67 in the tool body, and at least one air pressure equalization passage 70, to maintain ambient atmospheric pressure throughout the tool 50 as it undergoes compliance extension and retraction. By providing a rigid coupling 72 affixed to the tool housing 52 and a flexible pneumatic fluid tube 74 within the housing 52 to the motor 54 air supply port, contact, tugging, torque, and the like inadvertently applied to the pneumatic fluid supply line(s) does not transfer to the motor 54 or the operative tool surface 57, such as a grinder head. The motor air exhaust system 74 discharges exhaust air from the motor 54 throughout the tool's range of compliance motion, without affecting the tool's compliance by changing pressure, and without allowing the infiltration of dust or other particulates.

As used herein, the term "configured to" means set up, organized, adapted, or arranged to operate in a particular way; the term is synonymous with "designed to."

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A pneumatic robotic tool adapted to be attached to a robot arm, comprising:
    a rigid housing defining an interior space;
    a pneumatic motor disposed within the interior space of the housing, wherein a first cavity is defined within the interior space of the housing between the pneumatic motor and an end of the housing affixed to the robot arm; and
    a plurality of double-acting pneumatic pistons, each having a pneumatic chamber fore and aft of a piston member, disposed around the motor and moveably suspending the motor within the housing such that the motor exhibits compliance motion, throughout a predetermined range, toward or away from the robotic arm within the interior space of the housing, the double-acting pneumatic pistons further controlling a compliance force with which the robotic tool is applied against a workpiece; and
    means for mitigating an effect on the compliance motion or force of the pneumatic robotic tool caused by changes in air pressure in the interior space of the housing.

2. The tool of claim 1 wherein the compliance force of the tool is determined by air pressures in fore and aft chambers of each double-acting pneumatic piston.

3. The tool of claim 2 further comprising: a first pneumatic fluid line coupling affixed to the housing, and connected in pneumatic fluid flow relationship to the aft chamber of at least one double-acting pneumatic piston; and a second pneumatic fluid line coupling affixed to the housing, and connected in pneumatic fluid flow relationship to the fore chamber of the at least one double-acting pneumatic piston.

4. The tool of claim 2 wherein the means for mitigating an effect on the compliance motion or force of the pneumatic robotic tool caused by chances in air pressure in the interior space of the housing comprises at least one breather vent, comprising a screen, in the housing, the at least one breather vent adapted to allow air to flow through it in a back and forth direction while restricting ingress of particulates into the housing interior.

5. The tool of claim 4 wherein the at least one breather vent prevents air pressure change within at least the first cavity, due to compliance motion of the motor.

6. The tool of claim 1 further comprising:
    an end plate attached to the motor, and moveable with the motor's compliance motion;
    a flexible boot connected between the end plate and a distal end of the housing, the boot defining a second cavity within the boot and between the end plate and the motor, wherein the boot is adapted to prevent ingress of particulates into the second cavity throughout compliance motion of the motor and end plate; and
    wherein the means for mitigating an effect on the compliance motion or force of the pneumatic robotic tool caused by chances in air pressure in the interior space of the housing comprises an air pressure equalization passage connecting the first cavity and the second cavity in air flow relationship.

7. The tool of claim 6 wherein air pressure in both the first cavity and the second cavity are maintained in equilibrium with air pressure outside the housing, by the passage of air through both the breather vent and the air pressure equalization passage, throughout the range of compliance motion of the motor within the housing.

8. The tool of claim 1 further comprising: a motor drive pneumatic fluid line coupling affixed to the housing; and a flexible pneumatic supply tube connected, in pneumatic fluid flow relationship, between the motor drive pneumatic fluid line coupling and a motor drive pneumatic fluid port of the motor.

9. The tool of claim 8 wherein vibration, force, or torque imparted to a pneumatic fluid supply line attached to the motor drive pneumatic fluid line coupling is not transmitted to the motor.

10. The tool of claim 1 wherein the means for mitigating an effect on the compliance motion or force of the pneumatic robotic tool caused by chances in air pressure in the interior space of the housing comprises an exhaust system adapted to exhaust discharge air from the motor to the exterior of the housing throughout the range of compliance motion of the motor within the housing, the exhaust system comprising:
    a first rigid exhaust tube connected to an exhaust port of the motor, and adapted to move with the motor through compliance motion within the housing, the first rigid exhaust tube having an outer diameter;
    a second rigid exhaust tube fixedly connected to the housing at a second end, the second rigid exhaust tube having an inner diameter larger than the first tube outer diameter and receiving the first rigid exhaust tube at a first end;
    a seal disposed within the second rigid exhaust tube proximate the first end, and adapted to prevent air discharged through the first rigid exhaust tube from exiting the first end of the second rigid exhaust tube;
    a discharge port in the housing, the discharge port connected in air flow relationship to the second end of the second rigid exhaust tube and adapted to exhaust discharge air to the exterior of the housing.

11. The tool of claim 10 wherein the first and second rigid exhaust tubes and seal are adapted and arranged such that the first rigid exhaust tube is sealed within the second rigid exhaust tube by the seal, preventing the escape of exhaust air out of the first end of the second rigid exhaust tube, throughout the range of compliance motion.

12. A method of robotically finishing a workpiece using a pneumatic robotic finishing tool attached to a robot arm, the tool having a rigid housing defining an interior space, a pneumatic motor, and a plurality of double-acting pneumatic pistons suspending the motor within the interior space of the housing and allowing the motor to move within the interior space of the housing along a compliance axis, the method comprising:
    controlling a compliance force with which the tool is applied to the workpiece by maintaining predetermined pneumatic pressures in fore and aft chambers of each double-acting pneumatic piston; providing pneumatic fluid to drive the pneumatic motor;
    moving the robotic arm to move the tool over the workpiece, whereby the pneumatic motor exhibits compliance motion within the housing, independently of movement of the robotic arm along the compliance axis; and
    steps for mitigating an effect on the compliance motion or force of the pneumatic robotic tool caused by changes in air pressure in the interior space of the housing.

13. The method of claim 12 wherein maintaining predetermined pneumatic pressures in fore and aft chambers of each double-acting pneumatic piston comprises:

supplying pneumatic fluid to the aft chamber of at least one double-acting pneumatic piston via a first pneumatic fluid line coupling affixed to the housing and connected in pneumatic fluid flow relationship to the aft chamber; and supplying pneumatic fluid to the fore chamber of at least one double-acting pneumatic piston via a second pneumatic fluid line coupling affixed to the housing and connected in pneumatic fluid flow relationship to the fore chamber.

14. The method of claim 12 wherein steps for mitigating an effect on the compliance motion or force of the pneumatic robotic tool caused by changes in air pressure in the interior space of the housing comprise: providing at least one breather vent, comprising a screen, in the housing, the at least one breather vent adapted to allow air to flow through it in either direction while restricting ingress of particulates into the housing interior, so as to prevent air pressure in the housing behind the pneumatic motor from affecting compliance motion of the motor within the housing.

15. The method of claim 12 wherein the pneumatic motor defines a first cavity within the housing aft of the motor and a second cavity fore of the motor within a flexible boot connected to the housing, and wherein steps for mitigating an effect on the compliance motion or force of the pneumatic robotic tool caused by changes in air pressure in the interior space of the housing comprise: equalizing air pressure fore and aft of the pneumatic motor via an air pressure equalization passage connecting the first cavity and the second cavity in air flow relationship.

16. The tool of claim 15 further comprising maintaining air pressure in both the first cavity and the second cavity in equilibrium with air pressure outside the tool housing, by the passage of air through both the breather vent and the air pressure equalization passage, throughout a range of compliance motion of the motor within the housing.

17. The method of claim 12 further wherein: providing pneumatic fluid to drive the pneumatic motor comprises providing a motor drive pneumatic fluid line coupling affixed to the housing and a flexible pneumatic supply tube connected, in pneumatic fluid flow relationship, between the motor drive pneumatic fluid line coupling and a motor drive pneumatic fluid port of the motor.

18. The method of claim 12 wherein steps for mitigating an effect on the compliance motion or force of the pneumatic robotic tool caused by changes in air pressure in the interior space of the housing comprise exhausting discharge air from the motor to the exterior of the tool housing throughout a range of compliance motion of the motor within the housing.

* * * * *